United States Patent [19]

Boutin

[11] Patent Number: 5,008,095

[45] Date of Patent: Apr. 16, 1991

[54] CLEAR AND COLORLESS BASIC ALUMINUM CHLOROSULFATES

[75] Inventor: Jean Boutin, Mions, France

[73] Assignee: Rhone-Poulenc Chimie, Courbevoie, France

[21] Appl. No.: 271,706

[22] Filed: Nov. 16, 1988

[30] Foreign Application Priority Data

Nov. 16, 1987 [FR] France .................................. 87 15775

[51] Int. Cl.$^5$ ........................... C01B 17/45; C01F 7/74
[52] U.S. Cl. ...................................... 423/467; 423/556; 252/175
[58] Field of Search .................. 423/467, 556; 252/175

[56] References Cited

U.S. PATENT DOCUMENTS

| | | | |
|---|---|---|---|
| 2,312,198 | 2/1943 | Slagle | 423/467 |
| 3,929,666 | 12/1975 | Aiba et al. | 423/556 |
| 4,582,627 | 4/1986 | Carlsson | 252/175 |
| 4,654,201 | 3/1987 | Carlsson | 423/467 |
| 4,826,606 | 5/1989 | Becker et al. | 423/467 |

FOREIGN PATENT DOCUMENTS

| | | |
|---|---|---|
| 0145686 | 6/1985 | European Pat. Off. . |
| 0218487 | 4/1987 | European Pat. Off. . |
| 2547695 | 10/1974 | Fed. Rep. of Germany . |
| 2559143 | 8/1985 | France . |

*Primary Examiner*—Michael L. Lewis
*Assistant Examiner*—Brian M. Bolam
*Attorney, Agent, or Firm*—Burns, Doane, Swecker & Mathis

[57] ABSTRACT

Clear and colorless solutions of basic aluminum chlorosulfates are prepared by reacting a slurry of calcium chloride and calcium carbonate with aluminum sulfate, separating calcium sulfate solids and a solution of basic aluminum chlorosulfate from the medium of reaction, and flocculating said solution of basic aluminum chlorosulfate with at least one nonionic or cationic polyelectrolyte flocculant.

11 Claims, No Drawings

CLEAR AND COLORLESS BASIC ALUMINUM CHLOROSULFATES

BACKGROUND OF THE INVENTION

1. Field of the Invention

The present invention relates to the preparation of a purified basic aluminum chlorosulfate.

2. Description of the Prior Art

Basic aluminum chlorosulfates are materials well known to this art which are especially useful as coagulating agents in the treatment of aqueous media.

Thus, in published European Patent Application No. 218,487 a process is described for the preparation of such chlorosulfates having the indicated utility. This process is characterized by the following sequence of stages:

(i) initially, a slurry is formed of a mixture of calcium chloride and calcium carbonate;

(ii) the slurry is then reacted (continuously or discontinuously) with aluminum sulfate; and (iii) finally, the reaction mixture produced in this manner is filtered, whereby a calcium sulfate filter cake and a filtrate containing the desired basic aluminum chlorosulfate is obtained.

When employed as coagulating agents for the treatment of impure aqueous media (for example, effluents, residual waters, waste waters, drinking waters, etc.), these compounds have been found to display a remarkable performance relative to both their stability and their coagulating and flocculating capacity, and result in an especially low degree of residual aluminum in the waters treated, over a wide range of pH values.

However, as indicated in the aforesaid '487 application, the basic aluminum chlorosulfate solutions obtained after the filtration of the reaction medium may display, in certain cases, a color varying from a very deep brown to a dark yellow, and a turbidity that is very much higher than one hundred NTU units.

Such turbidity, which may militate against the use of these solutions, is due to a particularly high proportion of solids in solution, specifically relative to gypsum fines which pass through the filter in the filtering stage, and it is likely that the strong coloration of the resulting solutions emanates from colored impurities, based in particular on iron and humic acid substances, with the nature and amounts of colorants in the final product certainly varying as a function of the quality of the raw materials employed.

To eliminate this disadvantage, it is proposed in the '487 application to add, whether together or separately, in at least one of the stages of the process described, but always prior to filtration, at least one adsorbent agent and at least one flocculating polyelectrolyte of the nonionic or cationic type. The adsorbent agent particularly recommended is activated charcoal.

However, such an improvement nevertheless has several serious disadvantages.

On the one hand, it makes it necessary to use activated charcoal, which colors and pollutes the gypsum cake formed in the filtering stage; it then becomes impossible to market the large amounts of recovered gypsum, particularly to the paper industry.

On the other hand, it requires a very careful filtering stage to ensure that the activated charcoal does not pass through the filters to color the final solution of the basic aluminum chlorosulfate. This second problem is generally limited by increasing the amounts of the polyelectrolyte introduced, but obviously to the detriment of the economy of the process.

Finally, it is observed that the turbidity of the final solutions of the basic aluminum chlorosulfate upon completion of the process, already low (on the order of about ten NTU units), cannot be further significantly reduced, even after filtering and/or extensive decantation.

SUMMARY OF THE INVENTION

Accordingly, a major object of the present invention is the provision of a simple, efficient and economical improved process for the preparation, both reliably and reproducibly, of basic aluminum chlorosulfate solutions which are both colorless and have a very low turbidity, even less than 5 NTU units, which improved process conspicuously ameliorates those disadvantages and drawbacks to date characterizing the state of this art.

Briefly, the present invention features an improved process for the preparation of basic aluminum chlorosulfate, comprising a stage for the preparation of a calcium chloride and calcium carbonate slurry (chlorocarbonate slurry), a stage of contacting such chlorocarbonate slurry with aluminum sulfate, followed by a stage of separating the reaction mixture produced in this manner, thus enabling the separation, on the one hand, of the calcium sulfate filter cake, and, on the other, of a solution containing the desired basic aluminum chlorosulfate, which improved process includes adding to the solution obtained after separation at least one flocculating polyelectrolyte of the nonionic or cationic type.

DETAILED DESCRIPTION OF THE PREFERRED EMBODIMENTS OF THE INVENTION

More particularly according to the present invention, in addition to the fact that the subject process makes it possible to eliminate the use of adsorbents, in particular activated charcoal (whereby avoiding the disadvantages inherent in its use), it also, quite unexpectedly and surprisingly, enables production of basic aluminum chlorosulfate solutions which are both colorless and clear (turbidity less than 5 NTU units), while at the same time permitting economic advantage relative to the amount of flocculating agents that must be used.

The process according to the invention is thus essentially characterized in that a flocculating polyelectrolyte of the nonionic or cationic type is added to the solution obtained after the separation of the liquid and solid phases, as described.

The polyelectrolytes suitable for use according to the present invention are materials well known to this art. Typically, these are high molecular weight polymers, having molecular weights on the order of one or several millions, or more.

Exemplary of the polyelectrolytes of the nonionic or cationic type which may be used in the present invention, particularly representative are the polyacrylamides, poly(ethylene oxides), polyvinylpyrrolidones and polyvinyl alcohols.

The polyacrylamides are preferably used.

The polyelectrolytes of the cationic type suitable for use according to the present invention are, in particular, the following:

(i) neutral and quaternary polyamines. The neutral and quaternary polyalkyleneamines and polyhydroxyalkyleneamines are especially representative. Exemplary thereof are the following homopolymers: polyethyleneamine, 2-hydroxy-1-propyl-1-N-methylammonium polychloride, 2-hydroxy-1-propyl-1-N-dimethylammonium polychloride,2-vinylimidazolinium-polyhydrogenosulfate and diallyldimethylammonium polychloride. The copolymer produced from acrylamide and diallyldimethylammonium chloride is also suitable.

(ii) polyaminoacrylates and polyaminomethacrylates, and more particularly the polydialkylaminoalkylacrylates and the polydialkylaminoalkylmethacrylates. Exemplary thereof are the neutral or quaternary poly(N,N-dimethylaminoethylmethacrylates, whether in the form of the homopolymers thereof, or copolymers with acrylamide.

(ii) the polyaminoacrylamides and polyaminomethacrylamides, and more particularly the polydialkylaminoalkylacrylamides or methacrylamides. Specific examples are the poly-N-dimethylaminopropylmethacrylamides and the poly-N-dimethylaminomethylacrylamides.

Obviously, the above list of polyelectrolytes is given by way of example only and is not limiting. All polyelectrolytes, whether singly or as mixtures thereof, with the exception of those of the anionic type well known to this art, are suitable for use according to the present invention.

However, a polyelectrolyte of the nonionic type is preferably used, as it is observed that they provide better results, even when used in very small amounts.

The amount of flocculating agent introduced naturally depends upon the desired quality of the final product basic aluminum chlorosulfate solution. However, it has surprisingly been determined that, in all cases, very small amounts of the flocculating agent provide the desired results.

In actual practice, amounts of from 0.1to 5 g of the polyelectrolyte are used per ton of the basic aluminum chlorosulfate solution to be treated.

Preferably, this amount ranges from 0.1 to 3 g/t, and even more preferably from 0.3 to 2 g/t.

As indicated above, the treatment according to the present invention is applicable to any basic aluminum chlorosulfate solution obtained by a method entailing reacting aluminum sulfate with a mixture of calcium chloride and calcium carbonate, the beginning amounts of the starting chlorocarbonate and aluminum sulfate being adjusted in conventional manner as a function of the stoichiometry desired in the final product.

Nevertheless, the process of the invention is applied most advantageously to basic aluminum chlorosulfates having a basicity (defined as the ratio of OH equivalent/Al equivalent) of from 0.4 to 0.65, preferably from 0.4 to 0.6, an Al equivalent/Cl equivalent ratio of from 2.8 to 5, preferably from 3.2 to 4, and a desulfation proportion (defined by convention as the ratio of the amount of sulfate eliminated to the amount of sulfate present in the starting material aluminum sulfate), of from 70% to 90%, preferably from 70% to 85%.

For a detailed description of particular operating parameters, see EP-A-218,487, hereby incorporated by reference.

Following the treatment according to the invention, i.e., the addition of a polyelectrolyte such as defined above, the basic aluminum chlorosulfate solution is permitted to settle until a perfectly clear and colorless solution is obtained. This settling stage may optionally be replaced and/or followed by a filtering stage, such as to render the duration of the process according to the invention more compatible with industrial requirements.

It has also been found that the intrinsic properties of the basic aluminum chlorosulfates are not adversely affected and/or modified by the treatment according to the invention, in particular relative to their flocculating power.

In order to further illustrate the present invention and the advantages thereof, the following specific examples are given, it being understood that same are intended only as illustrative and in nowise limitative.

COMPARATIVE EXAMPLE 1

288.16 g of an industrial chalk comprising 33.8% by weight $OH^-$ content, marketed under the trademark "CM 100" by the Meacomya Co., was acidified with 226.5 g HCl, in a concentration of 32.4% by weight.

The slurry produced in this manner (mixture of $CaCl_2$ and $CaCO_3$) was progressively added to 1,500 g aluminum sulfate having a titer of 8.3% by weight $Al_2O_3$ and 0.32% by weight of $OH^-$.

The slurry was added over a period of 2 hours under moderate agitation and at a temperature of 40° C.

The resulting reaction mixture (basic aluminum chlorosulfate + gypsum) was maintained under non-shearing agitation and at 40° C. for 4 hours.

The reaction mixture was then permitted to cool to 16° C. over 1 hour, while being maintained under agitation.

It was then filtered under vacuum (400 mm Hg). The gypsum filter cake was thus separated and filtered. The cake was washed with water (186.5 g) such as to provide a basic aluminum chlorosulfate solution, having a titer of 9.16% $Al_2O_3$ and a basicity of 0.522 (analysis by potentiometry without oxalate), as well as a degree of desulfation of 78.8%.

Visual observation of the solution indicated a very marked yellow color thereof; its APHA (ASTM-D-2108-71) index was 230, and its turbidity value was 31 NTU.

EXAMPLES 2 TO 5

The solution produced in Comparative Example 1 was subjected to flocculation in a jar test utilizing different amounts of the flocculant. The flocculating agent obtained was a nonionic polyelectrolyte of the polyacrylamide type (molecular weight of less than $10^6$), marketed under the trademark "FLOERGER 920 SH" by the Floerger Co.

The flocculating agent was first placed in an aqueous solution at a concentration of 1 g/l, then added to the basic aluminum chlorosulfate solution:
(i) rapid agitation: 2 min at 180 rpm;
(ii) slow agitation: 10 min at 40 rpm;
(iii) measurement of the turbidity of the supernatant as a function of the settling time.

The amount of flocculant introduced is expressed in g per ton of the solution treated. The coloration of the solution is also indicated, expressed in APHA indices after 69 hours of decantation. An APHA index of less than 100 corresponds to solutions which are quasi-colorless to the eye.

The results obtained are reported in Table I:

TABLE I

| EXAMPLES | AMOUNT OF POLYELECTROLYTE | TURBIDITY (NTU) After X Hours of Static Settling | | | | APHA Color Colorimetric Index |
| --- | --- | --- | --- | --- | --- | --- |
| | | 0 | 1 H, 30 min | 3 H | 69 H | |
| 1 | 0 | 31 | 31 | 31 | 31 | 230 |
| 2 | 0.56 | 31 | 18.5 | 16.0 | 4.4 | <100 |
| 3 | 1.13 | 31 | 14.5 | 12.5 | 3.9 | IDEM |
| 4 | 1.7 | 31 | 11.5 | 10.5 | 7.5 | IDEM |
| 5 | 2.26 | 31 | 11.0 | 8.5 | 7.8 | IDEM |

COMPARATIVE EXAMPLE 6

Another solution of basic aluminum chlorosulfate was prepared according to the procedure of Example 1.

The materials used were the following:
(i) HCl, 32.4%: 226.5 g;
(ii) industrial chalk "CM 100" comprising 33.6% OH: 289.9 g;
(iii) aluminum sulfate comprising 8.3% $Al_2O_3$ and 0.32% $OH^-$: 1,500 g.

A basic aluminum chlorosulfate having a titer of 9.5% $Al_2O_3$ and a basicity of 0.53 was produced (analysis by potentiometry, without oxalate), exhibiting a degree of desulfation of 79.7%.

The solution had a very marked yellow color by visual inspection; its APHA colorimetric index Was 300, and its turbidity was 36 NTU.

EXAMPLES 7 TO 10

The same experiments as described in Examples 2 to 5 were carried out on the solution obtained in Comparative Example 6. The polyelectrolyte was also the same. The turbidity and the APHA color of the solution treated are indicated after 18 hours of settling, followed by filtration on a GS WP, 0.22 micron millipore filter. An APHA index of less than 80 corresponds to a solution colorless to the eye.

It was impossible to filter the solution produced in Comparative Example 6, even after extended settling, due to the systematic clogging of the filter by the fine particles in suspension.

The results are reported in Table II:

TABLE II

| EXAMPLES | AMOUNT OF POLYELECTROLYTE (g/t of Solution treated) | TURBIDITY (NTU) After X Hours of Static Settling | | | | Turbidity and Color after Filtering | |
| --- | --- | --- | --- | --- | --- | --- | --- |
| | | 0 H | 1 H | 2 H | 18 H | NTU | APHA |
| 6 | 0 | 36 | 36 | 36 | 36 | — | 150 |
| 7 | 0.5 | 36 | 32.5 | 28 | 21 | 1.75 | 62 |
| 8 | 1 | 36 | 26 | 22 | 17 | 1.75 | 58 |
| 9 | 2 | 36 | 17.5 | 15.5 | 15 | 1.9 | 66 |
| 10 | 4 | 36 | 30 | 25 | 15 | 2.1 | 77 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a clear and colorless solution of a basic aluminum chlorosulfate, comprising reacting a slurry of calcium chloride and calcium carbonate with aluminum sulfate, separating calcium sulfate solids and a solution of basic aluminum chlorosulfate from the medium of reaction, and flocculating said solution of basic aluminum chlorosulfate with at least one nonionic or cationic polyelectrolyte flocculant.

2. The process as defined by claim 1, comprising recovering an essentially clear and colorless basic aluminum chlorosulfate from the medium of flocculation.

3. The process as defined by claim 1, said polyelectrolyte flocculant comprising a nonionic polyacrylamide, poly(ethylene oxide), polyvinylpyrrolidone or polyvinyl alcohol.

4. The process as defined by claim 3, said polyelectrolyte flocculant comprising a nonionic polyacrylamide.

5. The process as defined by claim 1, said polyelectrolyte flocculant comprising a cationic polyamine or quaternized polyamine.

6. The process as defined by claim 1, comprising flocculating said solution of basic aluminum chlorosulfate with from 0.1 to 5 g of polyelectrolyte per ton of solution.

7. The process as defined by claim 6, comprising flocculating said solution of basic aluminum chlorosulfate with from 0.1 to 3 g of polyelectrolyte per ton of solution.

8. The process as defined by claim 6, comprising flocculating said solution of basic aluminum chlorosulfate with from 0.3 to 2 g of polyelectrolyte per ton of solution.

9. The process as defined by claim 1, further comprising filtering said basic aluminum chlorosulfate from said medium of flocculation.

10. The process as defined by claim 1, wherein the amounts of said slurry of calcium chloride and calcium carbonate and said aluminum sulfate are such as to produce a basic aluminum chlorosulfate having a basicity of from 0.4 to 0.65, a ratio of Al equivalent/Cl equivalent ranging from 2.8 to 5, and a degree of desulfation of from 70% to 90%.

11. The process as defined by claim 10, said basicity ranging from 0.4 to 0.6, said ratio of Al equivalent/Cl equivalent ranging from 3.2 to 4, and said degree of desulfation ranging from 70% to 85%.

* * * * *